United States Patent
Jung et al.

(10) Patent No.: US 12,468,812 B2
(45) Date of Patent: Nov. 11, 2025

(54) COMPUTER-READABLE STORAGE MEDIUM, GATEWAY FOR TRANSMITTING THE SAME, AND SOFTWARE UPDATE METHOD USING THE SAME

(71) Applicants: Hyundai Motor Company, Seoul (KR); Kia Corporation, Seoul (KR)

(72) Inventors: Yoon Sik Jung, Seoul (KR); Myeong Gyu Jeong, Seoul (KR); Jin Ah Kim, Hwaseong-Si (KR); Hak Jun Kim, Goyang-Si (KR); Min Gi Kim, Wonju-Si (KR); Hyeok Sang Jeong, Gunpo-Si (KR); Young Jee Yang, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 250 days.

(21) Appl. No.: 18/201,399

(22) Filed: May 24, 2023

(65) Prior Publication Data
US 2024/0104217 A1    Mar. 28, 2024

(30) Foreign Application Priority Data
Sep. 27, 2022    (KR) .................. 10-2022-0122883

(51) Int. Cl.
| | |
|---|---|
| H04L 29/06 | (2006.01) |
| G06F 8/65 | (2018.01) |
| G06F 21/57 | (2013.01) |
| G06F 21/60 | (2013.01) |

(52) U.S. Cl.
CPC .............. *G06F 21/572* (2013.01); *G06F 8/66* (2013.01); *G06F 21/602* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,632,765 | B1 | 4/2017 | Falcone et al. |
| 10,296,728 | B2 | 5/2019 | Nam et al. |
| 11,182,485 | B2 | 11/2021 | Cho et al. |

(Continued)

FOREIGN PATENT DOCUMENTS

| | | |
|---|---|---|
| CN | 112100582 A | 12/2020 |
| JP | 2017-531236 A | 10/2017 |

(Continued)

*Primary Examiner* — Shin-Hon (Eric) Chen
(74) *Attorney, Agent, or Firm* — Banner & Witcoff, Ltd.

(57) ABSTRACT

A software package, a gateway for transmitting the same, and a software update method using the same are provided. A software package includes a binary file, a configuration file, and a hash file. The binary file includes read-only memory (ROM) data of a target controller. A management server generates the configuration file by combining a hash value obtained by hashing the binary file with meta information indicating an update procedure between a gateway and the target controller. The management server generates the hash file by hashing the configuration file. The gateway receives the software package and extract the binary file and the configuration file. The gateway transmits the binary file to the target controller according to the update procedure indicated by the meta information.

20 Claims, 8 Drawing Sheets

(56) References Cited

U.S. PATENT DOCUMENTS

| | | |
|---|---|---|
| 2017/0242986 A1 | 8/2017 | Nam et al. |
| 2019/0034637 A1 | 1/2019 | Cho et al. |
| 2019/0155590 A2 | 5/2019 | Rivas Silva et al. |
| 2019/0394046 A1* | 12/2019 | Su .......................... G06F 8/654 |
| 2020/0213126 A1* | 7/2020 | Schnabel ................ G07C 5/008 |
| 2021/0012008 A1* | 1/2021 | Kim ...................... H04L 9/0891 |
| 2021/0119807 A1* | 4/2021 | Chen ..................... H04L 9/3242 |
| 2022/0035621 A1* | 2/2022 | Nagano ..................... G06F 8/10 |
| 2023/0077706 A1* | 3/2023 | Tsang ................... H04L 9/3236 |
| | | 710/303 |
| 2024/0020145 A1* | 1/2024 | Qi ....................... G06F 9/45541 |

FOREIGN PATENT DOCUMENTS

| | | |
|---|---|---|
| JP | 2020-027624 A | 2/2020 |
| KR | 20190013018 A | 2/2019 |
| KR | 102132901 B1 | 7/2020 |

* cited by examiner

COMPUTER-READABLE STORAGE MEDIUM, GATEWAY FOR TRANSMITTING THE SAME, AND SOFTWARE UPDATE METHOD USING THE SAME

CROSS-REFERENCE TO RELATED APPLICATION

This application claims the benefit of priority to Korean Patent Application No. 10-2022-0122883, filed in the Korean Intellectual Property Office on Sep. 27, 2022, the entire contents of which are incorporated herein by reference.

TECHNICAL FIELD

The present disclosure relates to a computer-readable storage medium, a gateway for transmitting the same, and a software update method using the same, and more particularly, relates to transmitting software for update.

BACKGROUND

There has been an increase in devices with various services and functions for user convenience. For example, there has been an increase in accessory devices, in a vehicle, that provide various additional services other than a means of transportation.

A controller for operating various devices or vehicle accessory devices may be implemented with firmware. The firmware may be to control hardware and may be software that includes read-only memory (ROM) data stored in a read-only memory (ROM). When a change in software is required, the firmware may update the software through reprogramming.

The software update for reprogramming may be performed over-the-air (OTA) or via wired communications.

The update scheme may differ for each controller. For example, a memory area storing the software for update may differ, and a write and delay time or the like may differ in an update transmission process. Furthermore, relay schemes of gateways, for relaying software for reprogramming, may differ from each other.

Thus, software developers may need to customize update software depending on the types of controllers being used.

Furthermore, the gateway which relays software should differently reflect a reprogramming scheme depending on controllers.

Furthermore, because the software developer or the gateway, which relays software, may not be able to predict which scheme (e.g., OTA, wired, etc.) that controllers will utilize in the future, it may be more difficult for the software developer or the gateway to appropriately respond to it.

SUMMARY

The present disclosure has been made to solve the above-mentioned problems occurring in the prior art while advantages achieved by the prior art are maintained intact.

The present disclosure provides a computer-readable storage medium for generating a file for update using one scheme, irrespective of reprogramming schemes of controllers, a gateway for transmitting the same, and a software update method using the same.

The present disclosure provides a computer-readable storage medium for transmitting ROM data for update to controllers, irrespective of reprogramming schemes of the controllers, a gateway for transmitting the same, and a software update method using the same.

The present disclosure provides a computer-readable storage medium for transmitting ROM data for update without being constrained by a new reprogramming scheme capable of emerging in the future, a gateway for transmitting the same, and a software update method using the same.

The technical problems to be solved by the present disclosure are not limited to the aforementioned problems, and any other technical problems not mentioned herein will be clearly understood from the following description by those skilled in the art to which the present disclosure pertains.

According to one or more embodiments of the present disclosure, a non-volatile computer-readable medium may store instructions that, when executed by one or more processors, cause a gateway to: receive a software package including: a binary file including read-only memory (ROM) data of a target controller; a configuration file including a hash value obtained by hashing the binary file, and meta information indicating an update procedure between the gateway and the target controller; and a hash file generated by hashing the configuration file; and transmit the binary file to the target controller according to the update procedure indicated by the meta information.

The binary file may be an encrypted binary file. The hash value may be obtained by hashing, using a hashing algorithm, the encrypted binary file.

The configuration file may be in an extensible markup language (XML) format to assign the meta information to a predetermined node.

The configuration file may be encrypted using an encryption algorithm.

The hash file may be generated by hashing, using a hashing algorithm, the encrypted configuration file.

The instructions, when executed by the one or more processors, further cause the gateway to: decrypt the software package; and verify, using the hash file, integrity of the decrypted software package.

The meta information may further indicate consistency determination information for consistency verification. The meta information may be assigned to a predetermined extensible markup language (XML) node.

The update procedure may include at least one of a background transmission, a general update transmission, a tester transmission, or a rollback.

According to one or more embodiments of the present disclosure, a gateway may include: a communicator configured to receive a software package including a binary file including read-only memory (ROM) data of a target controller; a configuration file including: a hash value obtained by hashing the binary file, and meta information indicating an update procedure between the gateway and the target controller; and a hash file generated by hashing the configuration file. The gateway may further include a processor configured to: transmit the binary file to the target controller according to the update procedure indicated by the meta information.

The processor may be further configured to decrypt the hash file using a previously obtained key and verify, using the hash file, integrity of the software package.

The meta information may include consistency determination information. The processor may be further configured to confirm whether the consistency determination information indicates the target controller.

The update procedure indicated by the meta information may be at least one of a background transmission, a general update transmission, a tester transmission, or a rollback. The processor may be configured to transmit the binary file to the target controller according to the update procedure indicated by the meta information.

According to one or more embodiments of the present disclosure, a method may include: hashing, by a management server, a binary file including read-only memory (ROM) data of a target controller to obtain a hash value; generating, by the management server, a software package including: the binary file; and a configuration file including: the hash value, and meta information indicating an update procedure; extracting, by a gateway, the binary file and the configuration file from the software package; and transmitting, by the gateway, the binary file to the target controller according to the update procedure indicated by the meta information.

The generating of the software package may include: adding the hash value to the meta information to generate the configuration file.

The generating of the software package may include: generating the configuration file using an extensible markup language (XML) file format to assign the meta information to a predetermined node.

Generating of the software package may include: encrypting the configuration file.

Generating of the software package may further include: hashing the encrypted configuration file to generate a hash file; and compressing the binary file, the configuration file, and the hash file.

The method may further include: decompressing the software package; and decrypting the hash file using a previously obtained key and verifying integrity of the software package.

The meta information may include consistency determination information. The method may further include: prior to the transmitting of the binary file, confirming whether the consistency determination information indicates the target controller.

Transmitting of the binary file may be based on whether the gateway is disposed inside a vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
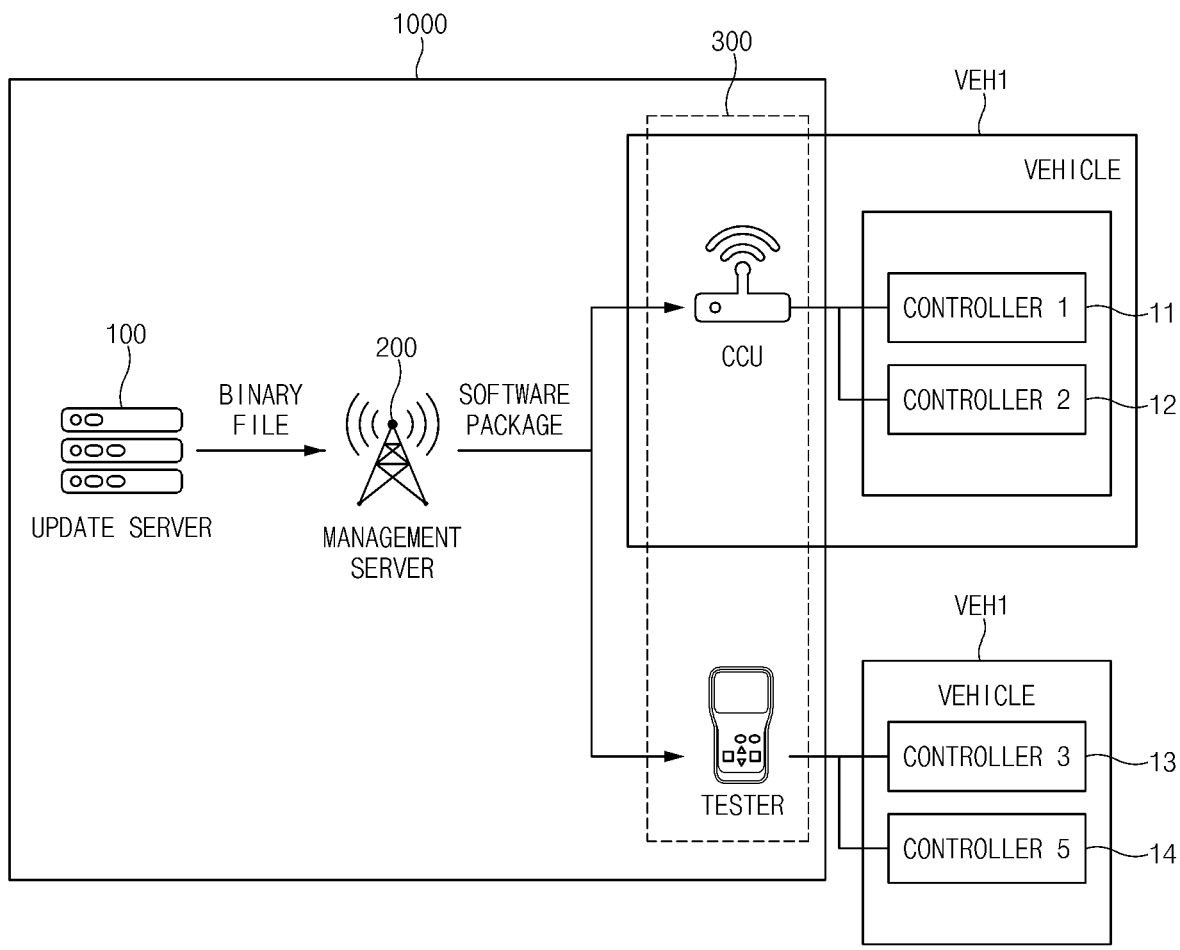
FIG. 1 is a drawing illustrating a configuration of a system for updating software of a controller.

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiments of the present disclosure, a detailed description of well-known features or functions will be ruled out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

Figure 2:
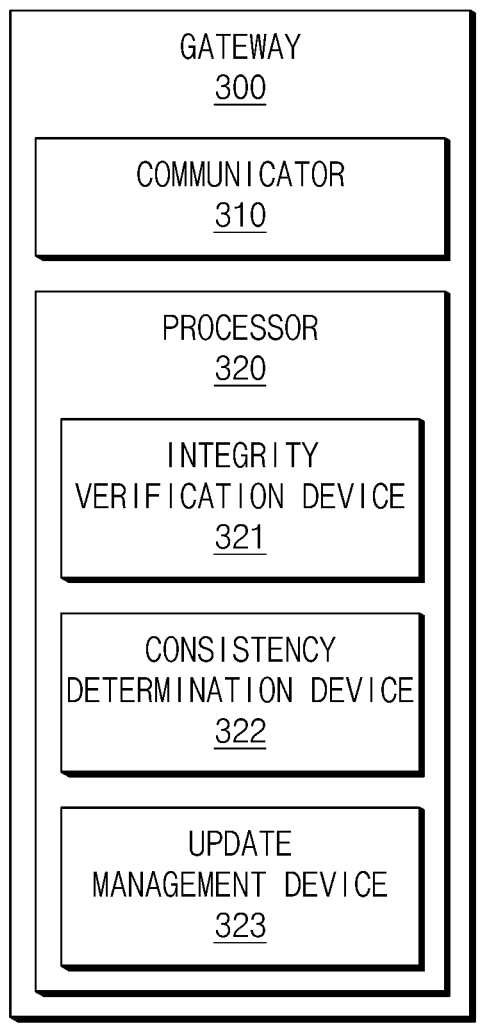
FIG. 2 is a block diagram illustrating a configuration of a gateway.

FIG. 1 is a drawing illustrating a configuration of a system for updating software of a controller. FIG. 2 is a block diagram illustrating a configuration of a gateway.

Referring to FIGS. 1 and 2, a system 1000 for updating software of a controller may include an update server 100, a management server 200, and a gateway 300.

The system 1000 for the software update is to update software of a target controller. Target controllers may be controllers 11 and 12 of a vehicle VHE1 to which an over-the-air programming (OTA) scheme is applied. Alternatively, the target controllers may be controllers 13 and 14 of a vehicle VEH2 in an on board diagnostics (OBD) scheme.

FIG. 1 illustrates the controllers being mounted on the vehicle, but the controllers may be mounted on apparatuses other than a vehicle. For example, the target controllers may be a controller of a device which is coupled to software to perform a specific function, other than the vehicle controller.

The update server 100 may be a server which makes software of the target controller or hosts a service and may be a server which hosts a software update of the target controller.

The update server 100 may compile a source code to generate a binary file which is an executable file. The binary file may include Romdata (also referred to as ROM data). The Romdata may refer to software update information of the target controller. The update server 100 may encrypt the binary file.

The update server 100 may transmit the binary file to the management server 200.

The management server 200 may receive the binary file from the update server 100 and may generate a software package based on the binary file.

The software package may include the binary file and a configuration file.

The binary file may a file which includes read-only memory (ROM) data and is delivered from the gateway 300 to the controller in the update process.

The configuration file may be generated by combining a hash value obtained by hashing the binary file with meta information.

The meta information of the configuration file may include procedure information and consistency determination information.

The procedure information may be to specify an update procedure from the gateway 300 to the target controller.

The consistency determination information may be information for determining whether a target indicated by the software package is identical to the target controller.

Furthermore, the software package may further include a hash file obtained by hashing the configuration file. The hash file may be data used for integrity verification in a decryption process.

The software package may be generating by combining the binary file, the configuration file, and the hash file and may be transmitted to the gateway 300 in a compressed state.

The gateway 300 may receive the software package from the management server 200 and may transmit the binary file to the target controller depending on the procedure information for specifying an update procedure in the meta information.

To this end, the gateway 300 may include a communicator (e.g., a communication module, a communication interface, etc.) 310 and a processor 320.

The communicator 310 may receive the software package from the management server 200 and may use a wired or wireless communication scheme.

The processor 320 may include an integrity verification device 321, a consistency determination device 322, and an update management device 323.

The integrity verification device 321 may decrypt the hash file and may verify integrity of the software package.

The consistency determination device 322 may determine consistency of the software package based on the consistency determination information of the meta information.

If it is determined that the software package and the target controller are matched with each other, the update management device 323 may transmit the binary file of the software package to the target controller based on the procedure information.

The gateway 300 may vary with a vehicle in which the target controller is disposed. If the target controller is the controller of the vehicle VEH1 to which the OTA scheme is applied, the gateway 300 may be a central communication unit (CCU) loaded into the vehicle VEH1. If the target controller uses the OBD scheme, the gateway 300 may be an OBD tester.

The update server 100 may communicate with the management server 200 using wireless communication. The management server 200 may communicate with the CCU using wireless communication. To this end, each of the update server 100, the management server 200, and the CCU may include a communication modem. The communication modem may transmit and receive a wireless signal with at least one of a base station, an external terminal, or a center on a mobile communication network established by technical standards for mobile communication. The communication standard may use global system for mobile communication (GSM), code division multi access (CDMA), code division multi access 2000 (CDMA2000), enhanced voice-data optimized or enhanced voice-data only (EV-DO), wide-band CDMA (WCDMA), high speed downlink packet access (HSDPA), high speed uplink packet access (HSUPA), long term evolution (LTE), or long term evolution-advanced (LTE-A).

Figure 3:
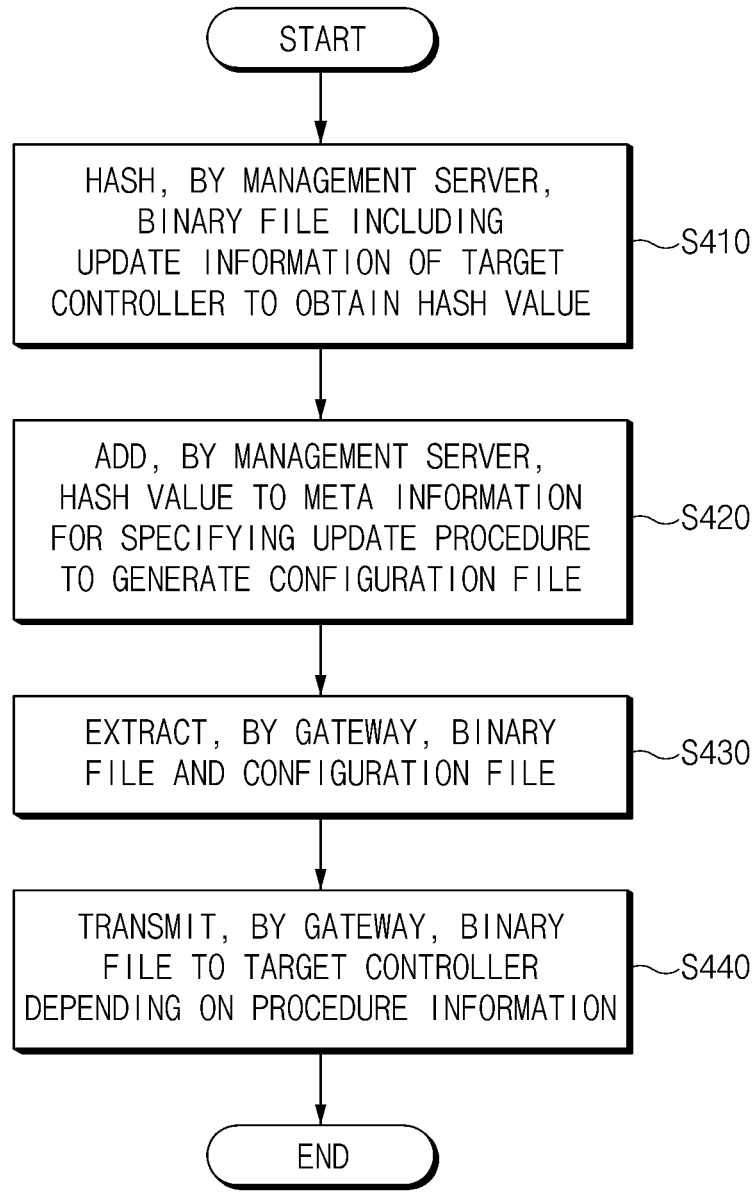
FIG. 3 is a drawing schematically illustrating a process of encrypting a binary file including ROM data used for a software update.

FIG. 3 is a drawing schematically illustrating a process of encrypting a binary file including ROM data used for a software update.

Referring to FIG. 3, an update server 100 of FIG. 1 may encrypt a binary file including ROM data.

The update server 100 may hash the binary file based on advanced encryption standard (AES)-128 to obtain an encrypted binary file. In other words, the update server 100 may encrypt the binary file using an algorithm capable of performing encryption and decryption with a symmetric key.

The binary file transmitted to a management server 200 of FIG. 1 may be a file in which encryption does not proceed. Thus, the binary file, which will be described below, may refer to a file which is encrypted and a file which is not encrypted.

Figure 4:
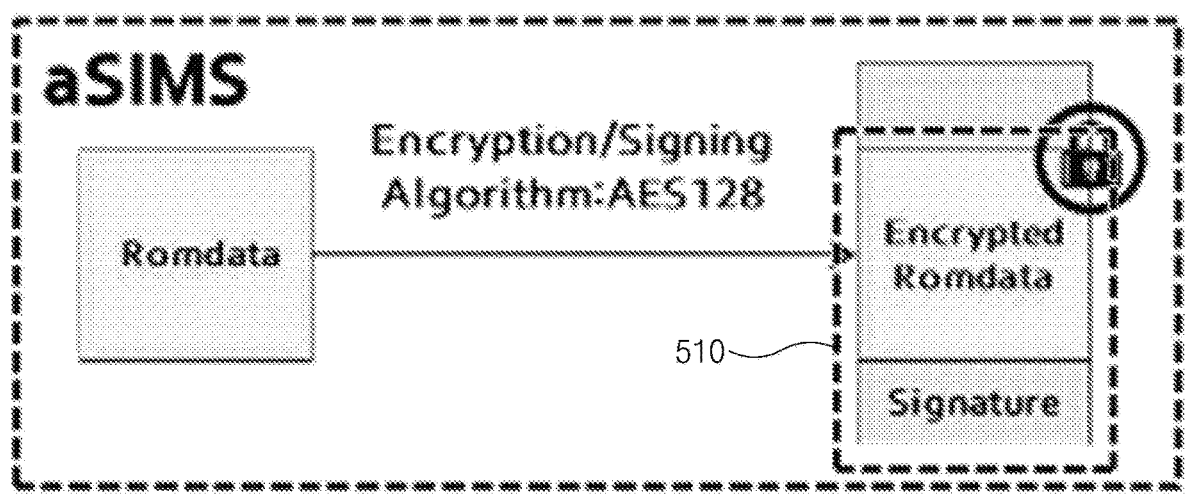
FIG. 4 is a flowchart illustrating a software update procedure.

FIG. 4 is a flowchart illustrating a software update procedure. A procedure shown in FIG. 4 may be a procedure for transmitting a binary file shown in FIG. 3 to a controller.

A description will be given for ROM data that is transmitted to a target controller based on a binary file generated by an update server 100 of FIG. 1 with reference to FIG. 4.

In S410, a management server 200 of FIG. 1 may hash the binary file provided from the update server 100 to obtain a hash value.

In S420, the management server 200 may combine the hash value with meta information to generate a configuration file. The meta information may be information for specifying an update procedure where a software package is delivered from a gateway 300 of FIG. 1 to a controller.

In S430, the gateway 300 may extract the binary file and the configuration file.

The gateway 300 may unpack a software package to divide the binary file and the configuration file. If the software package is a compressed file, a procedure where the gateway 300 unpacks the software package may include a procedure for decompressing the compressed file.

In S440, the gateway 300 may identify procedure information and may transmit the binary file to a target controller depending on the procedure information.

Figure 5:
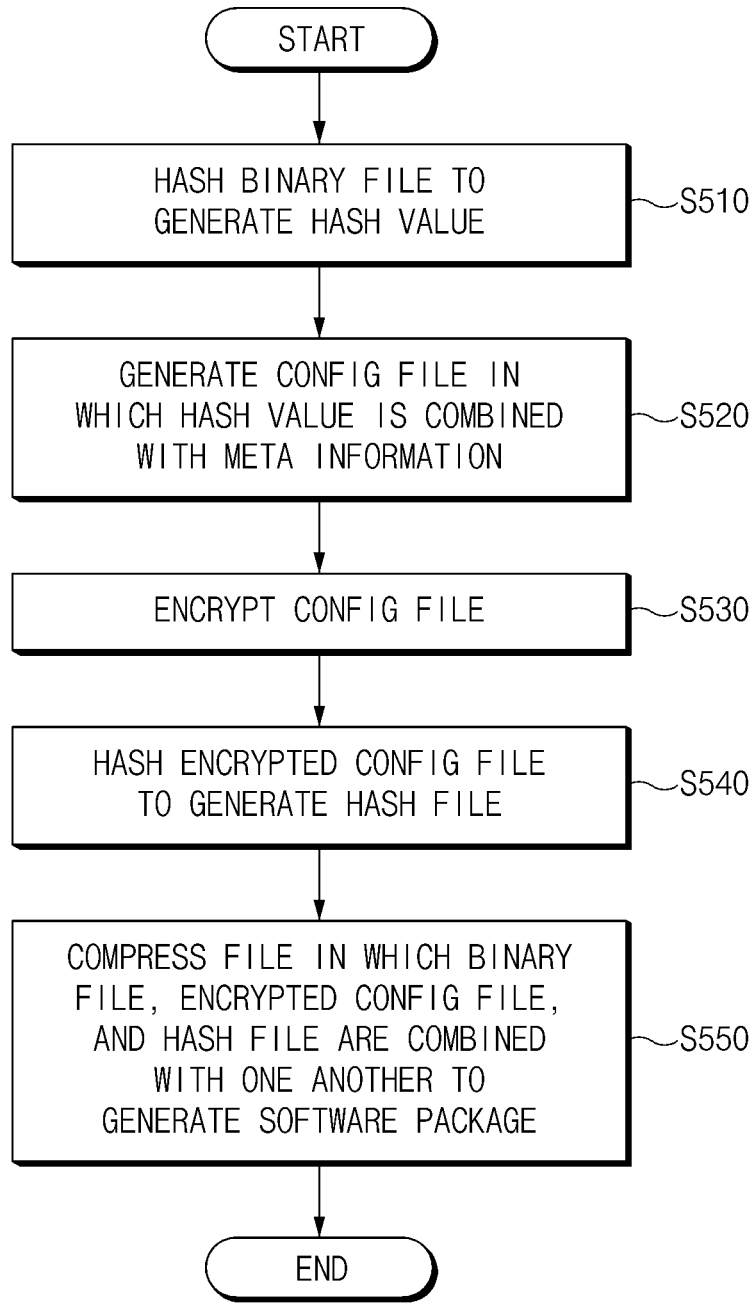
FIG. 5 is a flowchart illustrating a method for generating a software package.
Figure 6:
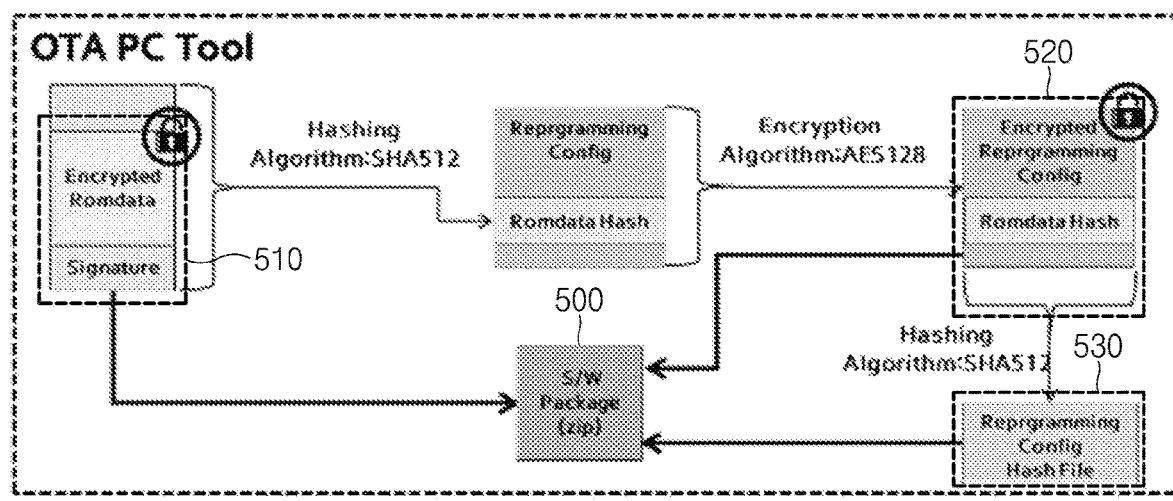
FIG. 6 is a drawing schematically illustrating a method for generating a software package.

FIG. 5 is a flowchart illustrating a method for generating a software package. FIG. 6 is a drawing schematically illustrating a method for generating a software package. FIGS. 5 and 6 may be a procedure which proceeds at a management server which receives a binary code from an update server.

A description will be given of a method for generating a software package with reference to FIGS. 5 and 6.

In S510, a management server 200 of FIG. 1 may hash a binary file to generate a hash value.

A hash algorithm may always return the same hash value with respect to a specific input value. For example, the management server 200 may hash a binary file 510 using an "SHA512" algorithm to obtain a hash value and may obtain a file with a 512-bit size and a length limit of 128 as a result of the hashing of the "SHA512" algorithm.

In S520, the management server 200 may generate a Config file in which the hash value is combined with meta information.

The meta information may include consistency determination information and procedure information.

The consistency determination information may be used in a process of determining whether a target to which a software package should be delivered is identical to a target controller.

The procedure information may be information for specifying a procedure of updating the software package.

The Config file may use an XML file scheme, and the consistency determination information and the procedure information may be matched with a predetermined node.

The consistency determination information may be matched with an "instance" node.

The "instance" node may include a "version" node, a "rom" node, a "vehicle Name" node, an "ECU Name" node, a "partNo" node, and a "security" node.

The "version" node may include an update source version and an update target version. For example, the "version" node may include information of <information:software source="1.07" target="1.08"/>.

The "rom" node may be a node in which a rom file path and a hash value for binary are stored.

The "vehicle Name" node may be a node in which vehicle type information is defined.

The "ECU Name" node may be a node in which a controller name is stored.

The "partNo" node may be a node in which part number information is stored.

The "security" node may be a node in which encryption key information for each controller necessary to complete reprogramming is defined.

A procedure information node may include a "background-rule" node, a "reprogram-rule" node, a "rollback-rule" node, an "external-rule" node, and an "error-rule" node.

The "background-rule" node may be a node including information for specifying a procedure of transmitting a first hash file in a background state while the vehicle is traveling.

The "reprogram-rule" node may be a node including information for specifying a general scenario procedure.

The "rollback-rule" node may be a node including information for specifying a rollback scenario.

The "external-rule" node may be a node including information for specifying an external tester transmission procedure.

The "error-rule" node may be a node including information for specifying a response procedure for the case where an error occurs in the update procedure.

Each of the procedure information nodes may include a "Rule-preparation" node for specifying a pre-procedure, a "Rule" node for specifying the present procedure, and a "Rule-Complete" node for specifying a post-procedure.

Information included in the "Rule-preparation" node, the "Rule" node, and the "Rule-Complete" node may be fluid and may include a "startCommunication" node, a "routineControl" node, a "requestDownload" node, a "transferData" node, a "transferExit" node, an "ecuReset" node, a "delay" node, and a "frame" node.

The "startCommunication" node may be a node including setting information associated with communication and may include a "protocol" node, an "Application" node, a "moduleID" node, a "testerID" node, and a "requestType" node.

The "protocol" node may include information for defining a communication protocol of the update procedure. The communication protocol may be divided into CAN communication, CAN-FD communication, Ethernet communication, and LS-CAN communication.

The "Application" node may be a node including information for dividing a unified diagnostic service (UDS) protocol or an OTA scheme.

The "moduleID" node may include a node including diagnostic ID information at a controller side.

The "testerID" node may include a node including diagnostic ID information at a tester side.

The "requestType" node may be a node including information for dividing physical or functional information.

Furthermore, the "requestType" node may include an "stMin" node, a "p2CanServerMax" node, a "p2StartCanServerMax" node, and the like to define a specification associated with communication.

The "routineControl" node may be a node including a diagnostic service request information and may include a "serviceId" node and a "confirmPositive" node.

The "serviceId" node may include service ID information. The "confirmPositive" node may be a node including information about whether to determine a positive response.

The "requestDownload" node, the "transferData" node, and the "transferExit" node may include information for binary transmission and may include information for specifying a memory size and a memory location.

The "ecuReset" node may be an instruction for reset after completing an update.

The "delay" node may be a node used if waiting is requested, for example, reset delay.

The "frame" node may include information for transmitting any value which is not determined as a template.

In S530, the management server 200 may encrypt the Config file.

The management server 200 may encrypt the Config file using an AES128 algorithm. In other words, the encrypted Config file 520 may include meta information and a hash value. The configuration file may refer to the encrypted Config file 520 and a Config file before encryption.

In S540, the management server 200 may hash the encrypted Config file 520 to generate a hash file.

The management server 200 may hash the encrypted Config file 520 to generate the hash file. The management server 200 may use an SHA512 algorithm to generate the hash file.

In S550, the management server 200 may compress a file in which the binary file, the encrypted Config file, and the hash file are combined with one another to generate a software package 500.

Figure 7:
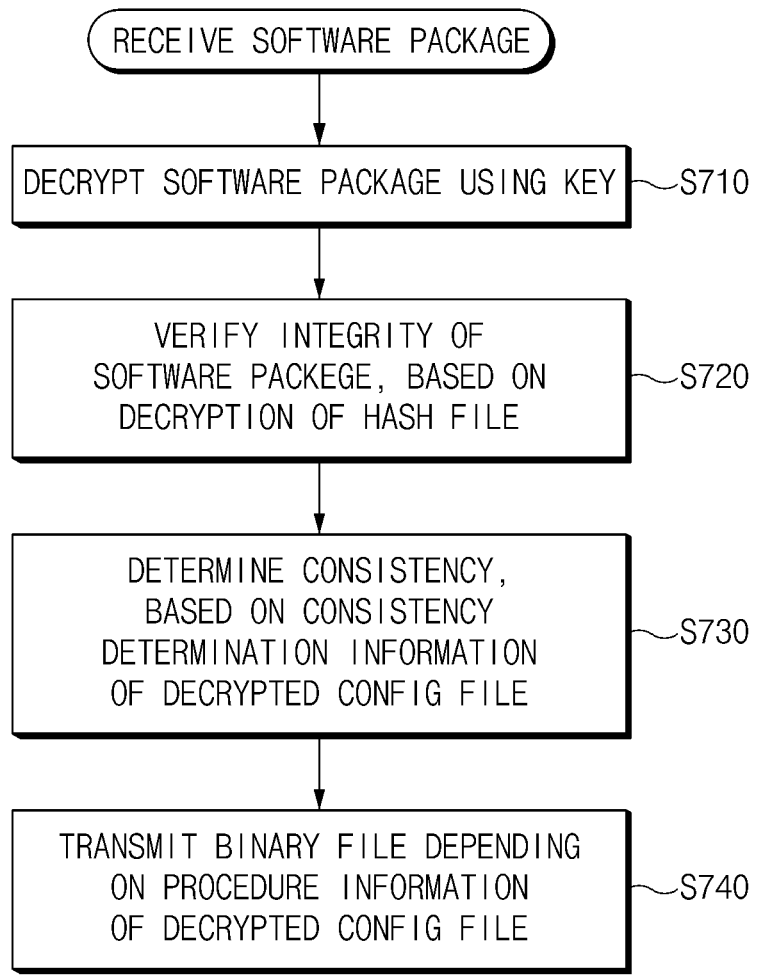
FIG. 7 is a flowchart describing a software update method.

FIG. 7 is a flowchart describing a software update method. FIG. 7 may be a procedure performed by a gateway to transmit a software package, provided from a management server, to a controller.

A description will be given of the software update method with reference to FIG. 7.

In S710 and S720, a gateway 300 of FIG. 1 may decrypt a software package using a key and may verify integrity of the software package in the process of decrypting the software package.

Because a hash algorithm returns the same hash value with respect to a specific input value, the gateway 300 may determine whether the software package is not modulated using a previously promised key.

In S730, the gateway 300 may determine consistency of a decrypted Config file.

Because the decrypted Config file is a file encrypted in a bidirectional encryption scheme having a symmetric key using an AES128 algorithm, meta information may be decrypted.

The gateway 300 may identify a predetermined instance node in the decrypted Config file and may determine consistency.

In S740, if it is determined that the software package is identical to a target controller based on consistency determination information, the gateway 300 may identify procedure information in the decrypted Config file. To this end, the gateway 300 may identify predetermined procedure information nodes in an XML node of the decrypted Config file.

For example, the gateway 300 may identify a "background-rule" node, a "reprogram-rule" node, a "rollback-rule" node, an "external-rule" node, and an "error-rule" node.

The gateway 300 may transmit a binary file to the target controller in a manner specified by the procedure information node.

A description will be given in detail of the procedure in S740.

Figure 8:
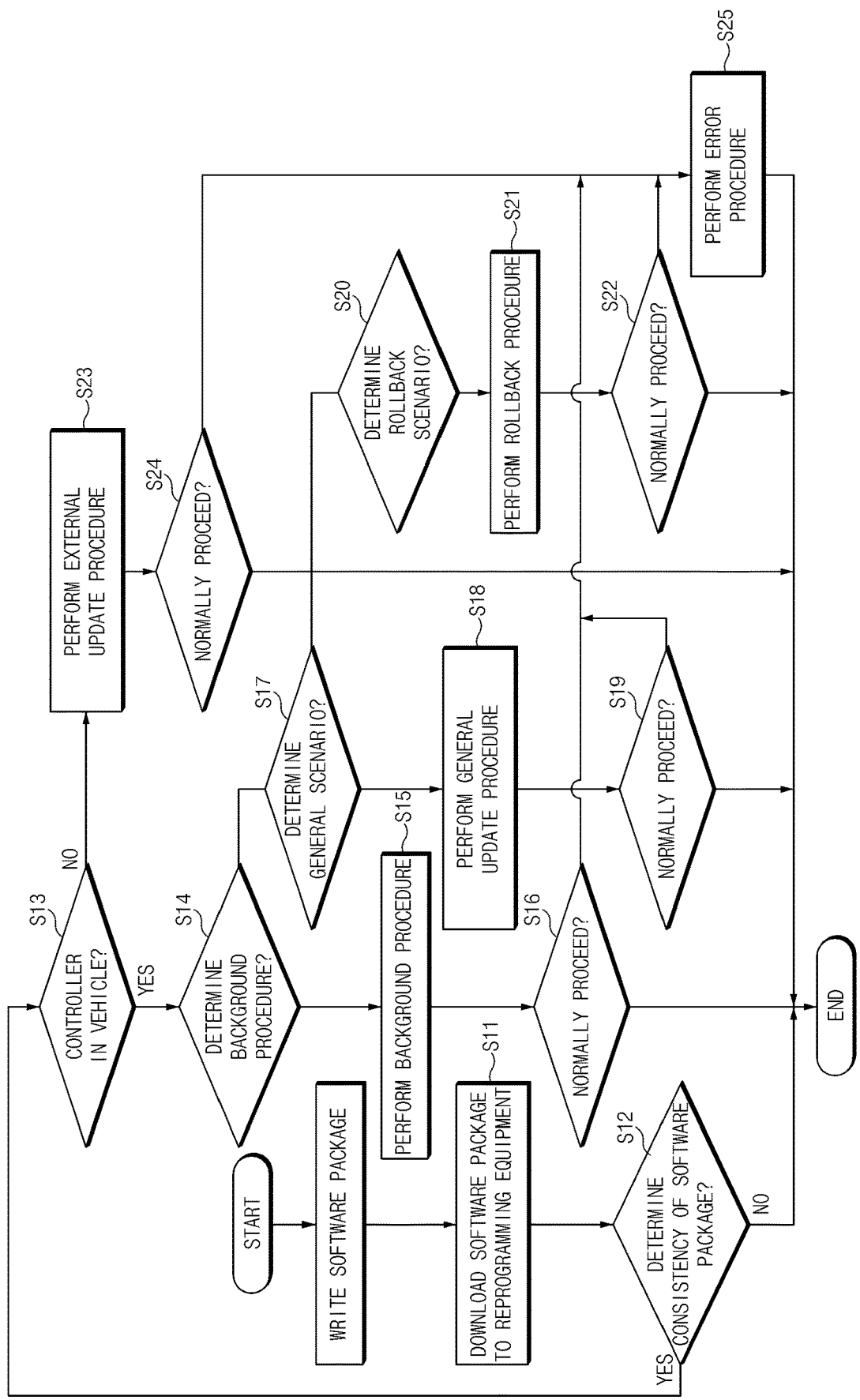
FIG. 8 is a flowchart illustrating a software update method.

FIG. 8 is a flowchart illustrating a software update method. A procedure of transmitting a binary file from a gateway to a controller will be described by the software update method shown in FIG. 8. In other words, the software update method shown in FIG. 8 may be separated from a procedure where the controller reprograms ROM data in firmware.

The software update procedure will be described with reference to FIG. 8.

In S11, a gateway 300 of FIG. 1 may download a software package provided from a management server 200 of FIG. 1.

The software package may be generated by the management server 200. The management server 200 may generate the software package through a procedure in S410 and S420. Alternatively, the management server 200 may generate the software package through a procedure in S510 to S550.

The gateway 300 may receive the software package in an OTA scheme or a wired scheme.

An operation where the gateway 300 downloads the software package may include an operation of decrypting the software package.

In S12, the gateway 300 may determine consistency of the software package.

The gateway 300 may identify consistency determination information in meta information of a configuration file to determine consistency.

If there is no abnormality as a result of the determination of the consistency, in S13, the gateway 300 may identify whether a target controller is a controller in a vehicle.

To identify whether the target controller is the controller in the vehicle, the gateway 300 may identify a "background-rule" node of the configuration file.

In S14, the gateway 300 may identify the "background-rule" node of the configuration file to determine a background procedure.

In S15, the gateway 300 may proceed with a background update depending on a procedure specified in the "background-rule" node of the configuration file.

The gateway 300 may proceed with an update even in a state where the vehicle ignition is not turned off, based on the background update. While the vehicle is traveling, the vehicle may charge a vehicle battery using regenerative braking or a motor generator. Thus, the procedure of transmitting the binary file based on the background procedure may proceed irrespective of a state of charge (SOC) of the vehicle battery.

In S16, the gateway 300 may determine whether the update procedure which proceeds according to the background specification normally proceeds.

If the update procedure which proceeds according to the background specification does not normally proceed, an error procedure defined in S25 may be performed.

In S17, the gateway 300 may determine a general scenario.

To determine whether the binary file corresponds to the general scenario, the gateway 300 may identify a "reprogram-rule" node of the configuration file.

If information corresponding to the general scenario is matched with the "reprogram-rule" node, in S18, the gateway 300 may perform a general update procedure. The general update procedure may be an update procedure which proceeds after the vehicle ignition is turned off.

In S19, the gateway 300 may determine whether the update procedure which proceeds according to the general scenario procedure normally proceeds.

If the update procedure which proceeds according to the general scenario procedure does not normally proceed, the error procedure defined in S25 may be performed.

In S20, the gateway 300 may determine a rollback scenario.

To determine the rollback scenario, the gateway 300 may identify a "rollback-rule" node.

If there is information matched with the "rollback-rule" node, in S21, the gateway 300 may perform a rollback procedure.

In S22, the gateway 300 may determine whether the update procedure which proceeds according to the rollback scenario normally proceeds.

If the update procedure which proceeds according to the rollback scenario does not normally proceed, the error procedure defined in S25 may be performed.

In S23, the gateway 300 may determine whether the update procedure proceeds according to an external update procedure performance specification. The external update procedure may be performed by a tester outside the vehicle loaded with the gateway 300.

To identify whether the update procedure follows the external update procedure, the gateway 300 may identify an "external-rule" node of the configuration file. If there is information matched with the "external-rule" node, the gateway 300 may transmit a binary file to a target controller based on a procedure specified in the "external-rule" node.

In S24, the gateway 300 may determine whether the update which proceeds according to the external update procedure normally proceeds.

If the update which proceeds according to the external update procedure does not normally proceed, the error procedure defined in S25 may be performed.

The software package, the gateway for transmitting the same, and the software update method using the same may be provided to transmit ROM data for update using the standardized software package, such that a software developer does not need to consider various types of update procedures.

Furthermore, the software package, the gateway for transmitting the same, and the software update method using the same may be provided to transmit ROM data for update using the standardized software package, thus transmitting the ROM data to a target controller, which is an update target, irrespective of reprogramming schemes of controllers.

Furthermore, the software package, the gateway for transmitting the same, and the software update method using the same may be provided to transmit ROM data for update using the standardized software package, thus flexibly responding to a new type of reprogramming procedure although controllers will use the new type of reprogramming procedure in the future.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A non-volatile computer-readable medium storing instructions that, when executed by one or more processors, cause a gateway to:
   receive a software package comprising:
      a binary file comprising read-only memory (ROM) data of a target controller;
      a configuration file comprising:
         a hash value obtained by hashing the binary file, and
         meta information indicating an update procedure between the gateway and the target controller, wherein the configuration file is in an extensible markup language (XML) format to assign the meta information to a predetermined node; and
      a hash file generated by hashing the configuration file;
   transmit, based on the hash file and a procedure of the predetermined node, the binary file to the target controller; and
   cause the target controller to update the target controller with the ROM data according to the update procedure indicated by the meta information, wherein the update procedure indicated by the meta information is an update procedure associated with the predetermined node and configured for the target controller, and wherein the update procedure indicated by the meta information causes the target controller to perform a background update process while a device is in an operating state or delay an update process until the device transitions from the operating state to an idle state.

2. The non-volatile computer-readable medium of claim 1, wherein the binary file is an encrypted binary file, and wherein the hash value is obtained by hashing, using a hashing algorithm, the encrypted binary file.

3. The non-volatile computer-readable medium of claim 1, wherein the configuration file is encrypted using an encryption algorithm.

4. The non-volatile computer-readable medium of claim 3, wherein the hash file is generated by hashing, using a hashing algorithm, the encrypted configuration file.

5. The non-volatile computer-readable medium of claim 1, wherein the instructions, when executed by the one or more processors, further cause the gateway to:
   decrypt the software package;
   verify, using the hash file, integrity of the decrypted software package; and
   after verifying the integrity of the decrypted software package, identify the predetermined node.

6. The non-volatile computer-readable medium of claim 1, wherein the meta information further indicates consistency determination information for consistency verification, and wherein the meta information is assigned to a predetermined extensible markup language (XML) node.

7. The non-volatile computer-readable medium of claim 6, wherein the update procedure associated with the predetermined node comprises at least one of a background transmission, a general update transmission, a tester transmission, or a rollback, wherein the background transmission is configured to cause the target controller to perform the background update process, and wherein the general update transmission is configured to cause the target controller to delay an update process until the device transitions from the operating state to the idle state.

8. The non-volatile computer-readable medium of claim 1, wherein the instructions, when executed by the one or more processors, cause the gateway to receive the software package from a server via a wireless communication interface, and to route, based on the meta information, the binary file to the target controller among a plurality of controllers of a vehicle, and wherein the gateway is a gateway equipped in the vehicle or a gateway coupled to the vehicle.

9. A gateway comprising:
   a communication interface configured to receive a software package comprising:
      a binary file comprising read-only memory (ROM) data of a target controller;
      a configuration file comprising:
         a hash value obtained by hashing the binary file, and
         meta information indicating an update procedure between the gateway and the target controller, wherein the configuration file is in an extensible markup language (XML) format to assign the meta information to a predetermined node; and
      a hash file generated by hashing the configuration file; and
   a processor configured to execute at least one instruction stored in a memory to cause the gateway to:
   transmit, based on the hash file and a procedure of the predetermined node, the binary file to the target controller; and
   cause the target controller to update the target controller with the ROM data according to the update procedure indicated by the meta information, wherein the update procedure indicated by the meta information is an update procedure associated with the predetermined node and configured for the target controller, and wherein the update procedure indicated by the meta information causes the target controller to perform a background update process while a device is in an operating state or delay an update process until the device transitions from the operating state to an idle state.

10. The gateway of claim 9, wherein the processor is further configured to execute the at least one instruction to cause the gateway to:
    decrypt the hash file using a previously obtained key;
    verify, using the hash file, integrity of the software package; and
    after verifying the integrity of the software package, identify the predetermined node.

11. The gateway of claim 9, wherein the meta information comprises consistency determination information, and wherein the processor is further configured to execute the at least one instruction to cause the gateway to confirm whether the consistency determination information indicates the target controller.

12. The gateway of claim 11, wherein the update procedure indicated by the meta information is at least one of a background transmission, a general update transmission, a tester transmission, or a rollback; and
    wherein the processor is configured to execute the at least one instruction to cause the gateway to transmit the binary file to the target controller, according to the background transmission, to cause the target controller to perform the background update process while a vehicle comprising the target controller is driving on a road.

13. The gateway of claim 9, wherein the processor is configured to execute the at least one instruction to cause the gateway to receive the software package from a server via a wireless communication interface, and to route, based on the meta information, the binary file to the target controller among a plurality of controllers of a vehicle, and wherein the gateway is a gateway equipped in the vehicle or a gateway coupled to the vehicle.

14. A method comprising:
    receiving, by a gateway from a management server, a software package comprising:
        a binary file comprising read-only memory (ROM) data of a target controller, wherein the binary file has been hashed based on a hashing algorithm; and
        a configuration file comprising:
            a hash value associated with the hashed binary file, and
            meta information indicating an update procedure, wherein the configuration file is in an extensible markup language (XML) format to assign the meta information to a predetermined node;
    extracting, by the gateway, the binary file and the configuration file from the software package;
    based on a procedure of the predetermined node, transmitting, by the gateway, the binary file to the target controller; and
    causing the target controller to update the target controller with the ROM data according to the update procedure indicated by the meta information, wherein the update procedure indicated by the meta information is an update procedure associated with the predetermined node and configured for the target controller, and wherein the update procedure indicated by the meta information causes the target controller to perform a background update process while a device is in an operating state or delay an update process until the device transitions from the operating state to an idle state.

15. The method of claim 14, wherein:
    the hash value is added to the meta information to generate the configuration file.

16. The method of claim 14, wherein the software package comprises:
    the configuration file that is encrypted.

17. The method of claim 16, wherein:
    the encrypted configuration file is hashed to generate a hash file; and
    the binary file, the configuration file, and the hash file are compressed to form the software package.

18. The method of claim 17, further comprising:
    decompressing the software package;
    decrypting the hash file using a previously obtained key and verifying integrity of the software package; and
    after verifying the integrity of the software package, identifying the predetermined node.

19. The method of claim 14, wherein the meta information comprises consistency determination information, and wherein the method further comprises:
    prior to the transmitting of the binary file, confirming whether the consistency determination information indicates the target controller.

20. The method of claim 14, wherein the transmitting of the binary file is based on whether the gateway is disposed inside a vehicle.

* * * * *